(12) United States Patent
Kohli et al.

(10) Patent No.: US 11,068,967 B2
(45) Date of Patent: Jul. 20, 2021

(54) SYSTEMS AND METHODS FOR DYNAMIC GENERATION OF CUSTOMIZED PRODUCT LISTINGS

(71) Applicant: MasterCard International Incorporated, Purchase, NY (US)

(72) Inventors: Manoneet Kohli, O'Fallon, MO (US); Laurie Ann Nicoletti, White Plains, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 398 days.

(21) Appl. No.: 15/491,395

(22) Filed: Apr. 19, 2017

(65) Prior Publication Data
US 2018/0308155 A1 Oct. 25, 2018

(51) Int. Cl.
*G06Q 30/00* (2012.01)
*G06Q 30/06* (2012.01)

(52) U.S. Cl.
CPC ..... *G06Q 30/0641* (2013.01); *G06Q 30/0631* (2013.01)

(58) Field of Classification Search
CPC ............... G06Q 30/00; G06Q 30/0601; G06Q 30/0633; G06Q 30/0641; G06Q 30/0643
See application file for complete search history.

(56) References Cited

U.S. PATENT DOCUMENTS

| | | |
|---|---|---|
| 8,903,708 B2 | 12/2014 | Derks et al. |
| 9,342,216 B2 | 5/2016 | Padgett et al. |
| 9,558,479 B1 * | 1/2017 | Orr ...................... H04M 3/2281 |
| 2003/0158796 A1 * | 8/2003 | Balent .................. G06Q 10/087 705/28 |
| 2008/0226119 A1 * | 9/2008 | Candelore ............... G06F 16/58 382/100 |
| 2008/0279481 A1 * | 11/2008 | Ando .................... G06F 16/951 382/306 |
| 2009/0063307 A1 * | 3/2009 | Groenovelt .......... G06Q 10/087 705/28 |

(Continued)

OTHER PUBLICATIONS

Peters, Anicia, and Brian Mennecke. "The role of dynamic digital menu boards in consumer decision making." CHI'11 Extended Abstracts on Human Factors in Computing Systems. 2011. 1693-1698. (Year: 2011).*

*Primary Examiner* — Christopher B Seibert
(74) *Attorney, Agent, or Firm* — Armstrong Teasdale LLP

(57) ABSTRACT

A host computing device includes a processor and a memory. The host computing device is configured to receive geolocation data indicating a current location of a user computing device. The host computing device further receives a user identifier corresponding to the user. The host computing device identifies a merchant associated with the current location of the user computing device and retrieves user data associated with the user identifier. The host computing device generates a user profile message based on the user data and transmits the user profile message to a dynamic menu computing device operating a dynamic menu application. The user profile message activates the dynamic menu application and causes the dynamic menu application to display a customized list of menu items based on the user profile message.

21 Claims, 5 Drawing Sheets

(56) References Cited

U.S. PATENT DOCUMENTS

| | | | |
|---|---|---|---|
| 2009/0128335 A1* | 5/2009 | Leung | G06Q 30/0601 340/572.1 |
| 2010/0046842 A1* | 2/2010 | Conwell | G06K 9/32 382/218 |
| 2011/0221657 A1* | 9/2011 | Haddick | G02B 27/0172 345/8 |
| 2012/0246007 A1* | 9/2012 | Williams | G06Q 30/02 705/14.66 |
| 2012/0290366 A1* | 11/2012 | Giles | G06Q 40/02 705/14.1 |
| 2013/0179303 A1* | 7/2013 | Petrou | G06Q 30/0623 705/26.61 |
| 2013/0325640 A1 | 12/2013 | Morgan et al. | |
| 2014/0028712 A1* | 1/2014 | Keating | G06T 7/246 345/633 |
| 2014/0058893 A1* | 2/2014 | Cazanas | G06Q 30/0633 705/26.35 |
| 2014/0100996 A1* | 4/2014 | Klein | G06T 1/00 705/27.2 |
| 2014/0100997 A1* | 4/2014 | Mayerle | G06Q 30/0276 705/27.2 |
| 2014/0143105 A1* | 5/2014 | Shaw | G06Q 10/06311 705/30 |
| 2014/0152847 A1* | 6/2014 | Zomet | G06Q 30/0629 348/207.1 |
| 2015/0254789 A1 | 9/2015 | Neeld et al. | |
| 2015/0371303 A1 | 12/2015 | Suri et al. | |
| 2016/0098755 A1* | 4/2016 | Silvestro | G06Q 30/0258 705/14.56 |

\* cited by examiner

SYSTEMS AND METHODS FOR DYNAMIC GENERATION OF CUSTOMIZED PRODUCT LISTINGS

BACKGROUND

The field of the disclosure relates generally to dynamic product listing systems, and more particularly, to systems and methods for dynamically generating customized product listings based on consumer data.

A common point of consumer friction is unfamiliarity with the product listing (or menu) of goods and services offered by a particular merchant. When a consumer enters a merchant establishment (e.g., restaurant, retail store, etc.) for the first time, the consumer is often faced with a menu or display of goods and services available from the merchant with little to no guidance as to which items may meet the consumers' needs and preferences. Absent adequate guidance from merchant employees or the time-consuming process of studying each merchant offering, the consumer may unnecessarily delay their purchase, purchase the wrong goods or services, or forego purchasing goods or services from the merchant altogether. Such friction is compounded when the consumer speaks a different language, is unfamiliar with local culture and customs, or is new to the types of goods or services being offered. In light of the foregoing, it would be useful for merchants to provide dynamic menus to consumers emphasizing products and services available from the merchant that meet characteristics, preferences, and purchasing habits of the consumer.

BRIEF DESCRIPTION OF THE DISCLOSURE

In one aspect, a host computing device including one or more processors in communication with one or more memory devices is provided. The host computing device is configured to receive geolocation data indicating a current location of a consumer computing device and to receive a consumer identifier corresponding to a user of the consumer computing device. The host computing device is further configured to identify a merchant associated with the current location of the consumer computing device and to retrieve consumer data corresponding to the user of the consumer computing device. Based on the consumer data, the host computing device generates a consumer profile message that includes at least a portion of the consumer data and transmits the consumer profile message to a dynamic menu computing device. The dynamic menu computing device includes a dynamic menu application such that when the host computing device transmits the consumer profile message to the dynamic menu computing device, the consumer profile message activates the dynamic menu application to display on the dynamic menu computing device a customized list of menu items based, at least in part, on the consumer data included in the consumer profile message.

In a second aspect, a computer-implemented method for dynamically generating a custom menu of items available from a merchant is provided. The method is implemented by a host computing device and includes receiving, at the host computing device, geolocation data indicating a current location of a consumer computing device. The method also includes receiving, at the host computing device, a consumer identifier corresponding to a user of the consumer computing device. The host computing device identifies a merchant associated with the current location of the consumer computing device and retrieves consumer data corresponding to the user of the consumer computing device based on the consumer identifier. Based on the consumer data, the host computing device generates a consumer profile message that includes at least a portion of the consumer data and transmits the consumer profile message to a dynamic menu computing device. The dynamic menu computing device includes a dynamic menu application such that when the host computing device transmits the consumer profile message to the dynamic menu computing device, the consumer profile message activates the dynamic menu application to display on the dynamic menu computing device a customized list of menu items based, at least in part, on the consumer data included in the consumer profile message.

In yet another aspect, a non-transitory computer readable medium facilitating dynamic generation of a custom menu of items available from a merchant is provided. When executed by a host computing device including at least one processor in communication with at least one memory device, the computer executable instructions cause the host computing device to receive geolocation data indicating a current location of a consumer computing device and to receive a consumer identifier corresponding to a user of the consumer computing device. The instructions further cause the host computing device to identify a merchant associated with the current location of the consumer computing device and to retrieve consumer data corresponding to the user of the consumer computing device. Based on the consumer data, the host computing device generates a consumer profile message that includes at least a portion of the consumer data and transmits the consumer profile message to a dynamic menu computing device. The dynamic menu computing device includes a dynamic menu application such that when the host computing device transmits the consumer profile message to the dynamic menu computing device, the consumer profile message activates the dynamic menu application to display on the dynamic menu computing device a customized list of menu items based, at least in part, on the consumer data included in the consumer profile message.

BRIEF DESCRIPTION OF THE DRAWINGS

FIG. 1 is an example schematic illustration of a dynamic menu generation system in accordance with an exemplary embodiment of the present disclosure.

FIG. 2 is an example configuration of a consumer computing device that may be used in the dynamic menu generation system shown in FIG. 1.

FIG. 3 is an example configuration of a host computing device that may be used in the dynamic menu generation system shown in FIG. 1.

FIG. 4 is an example configuration of a dynamic menu computing device that may be used in the dynamic menu generation system shown in FIG. 1.

FIG. 5 is a flow chart illustrating an example method for dynamically generating a menu using the dynamic menu generation system and host computing device shown in FIG. 1.

Figure 1:
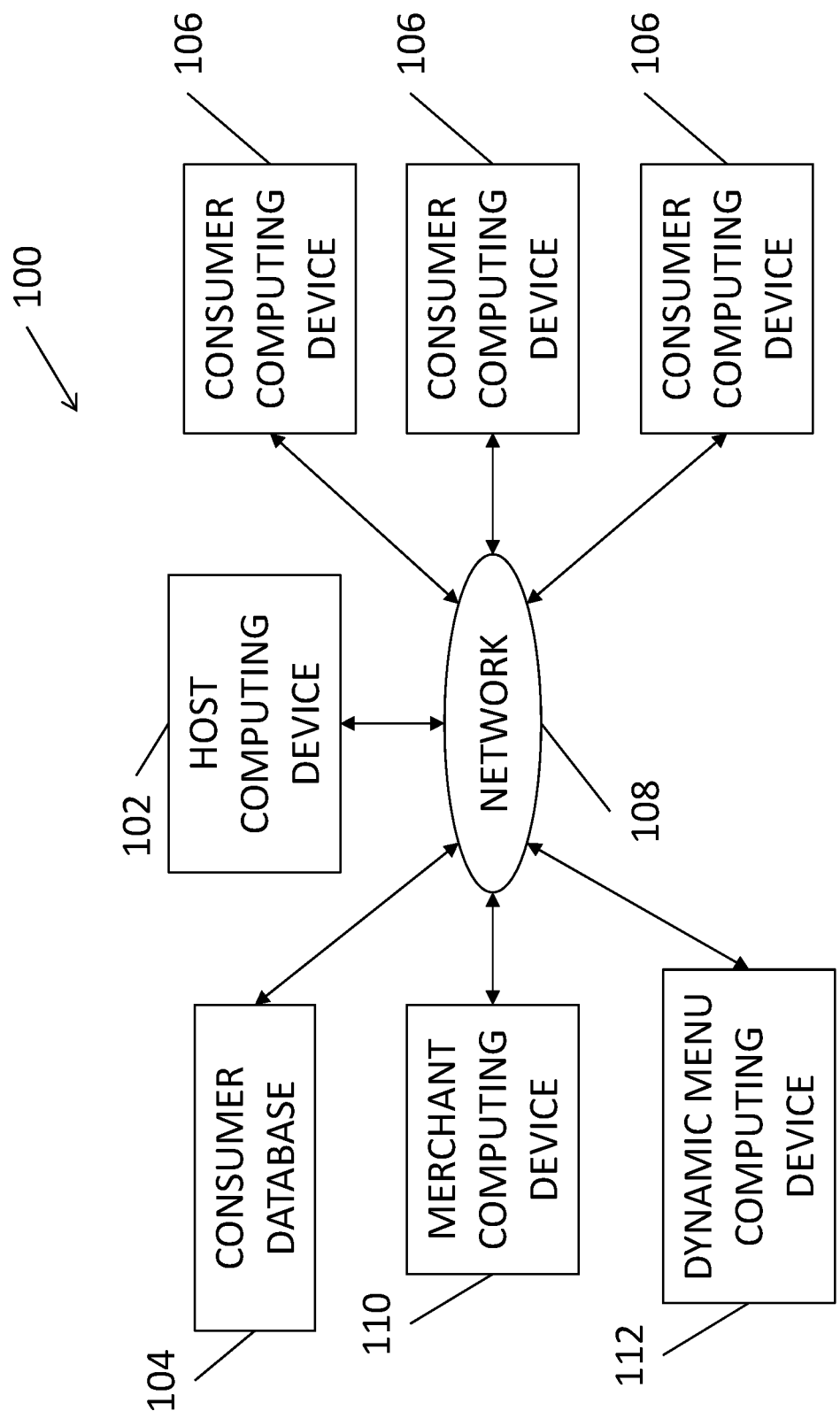
FIGS. 1-5 show example embodiments of the methods and systems described herein.

Like numbers in the figures indicates the same or functionally similar components. Although specific features of various embodiments may be shown in some figures and not in others, this is for convenience only. Any feature of any figure may be referenced and/or claimed in combination with any feature of any other figure.

DETAILED DESCRIPTION OF THE DISCLOSURE

The systems and methods described herein are directed to a host computing device for dynamic product listing (or menu) generation based on consumer data. During operation, the host computing device receives, from a consumer computing device, geolocation data from the consumer computing device corresponding to a location of the consumer computing device and, by extension, the user of the consumer computing device. In addition to the geolocation data, the consumer computing device provides a consumer identifier assigned to the user.

The host computing device identifies a merchant associated with the location represented by the geolocation data. For example, in certain embodiments, the host computing device compares the geolocation data received from the consumer computing device to a repository of geolocation data defining geographic areas corresponding to different merchants. To identify a merchant corresponding to the geolocation data received from the consumer computing device, the host computing device determines whether the geolocation data received from the consumer computing device falls within one of the geographic areas.

After identifying a merchant, the host computing device retrieves consumer data based on the consumer identifier received from the consumer computing device. In general, the host computing device is communicatively coupled to a consumer data source containing consumer data organized by consumer identifier and is configured to submit requests for consumer data or to otherwise retrieve consumer data from the consumer data source. As used herein, the term "consumer data" is intended to include any data corresponding to the preferences, habits, behavior, and characteristics of a consumer. Examples of consumer data for a given consumer include, without limitation, the consumer's age, the consumer's residential address, languages spoken by the consumer, data corresponding to past purchases by the consumer, item-level details (e.g., products or services purchased or preferred by the consumer), consumer data from a demographic in which the consumer belongs, consumer preferences regarding specific types of goods and services, and the like. Consumer data may be obtained in various ways. For example, in certain embodiments, a consumer may provide consumer data such as item-level details to the host computing device or other computing device communicatively coupled to the consumer data source. The consumer data may be provided directly by the consumer or indirectly (e.g., retrieving a device language setting from the consumer computing device). In at least some embodiments, the consumer may access an interface (e.g., an application or web portal) that enables the consumer to provide additional consumer data and/or to modify previously provided consumer data. As another example, consumer data may correspond to prior purchases performed by the consumer and may be obtained from a payment processor (e.g., a processor of payment transactions initiated with a payment card or payment account) or other entity associated with a payment card network. In other examples, consumer data may be derived from demographic data based on known characteristics of the consumer or may be obtained from a social media or similar account of the consumer.

In some embodiments, consumer data is collected by merchants during transactions, such as item-level details associated with purchased products and/or services, or other interactions with consumers (e.g., a consumer registering for an account with a merchant) and transmitted to the consumer data source. In one example, the merchant transmits the consumer data collected from a transaction with a consumer to the consumer data source separate from a payment authorization process within the payment network for the transaction. In certain embodiments, the host computing device may receive consumer data, such as item-level detail, from merchants through a web interface associated with the host computing device. In some embodiments, the host computing device is configured to infer at least some consumer data (e.g., item-level detail) based on collected merchant data associated with the merchant. The merchant data may be collected, for example, from the merchant, the merchant's website, third party databases, and the like. In one example, the host computing device may receive a purchase amount of a transaction with a merchant. The host computing device infers item-level detail based on the purchase amount, other consumer data (e.g., the consumer's preferences), and merchant data collected from the merchant's website.

After retrieving relevant consumer data, the host computing device generates a consumer profile message containing at least a portion of the relevant consumer data and transmits the consumer profile message to a dynamic menu computing device. The dynamic menu computing device includes a dynamic menu application configured to cause the dynamic menu computing device to display or otherwise present a dynamic menu. More specifically, the consumer profile message activates the dynamic menu application to display on the dynamic menu computing device a customized list of menu items based, at least in part, on the consumer data contained in the consumer profile message. The customized list of menu items is generally derived from a primary list of menu items that is then filtered and/or rearranged based on the contents of the consumer profile message. The customized list may be filtered based on the combination of multiple data elements of the consumer data. In one example in which the consumer is visiting a restaurant, if the consumer data indicates the consumer's country is India, which has a relatively high vegetarian population, but the consumer's previous transactions indicate that the consumer has purchased non-vegetarian food previously, the dynamic menu computing device may display a list including meat-based Indian cuisine or similar dishes.

In at least some embodiments, consumers and/or merchants opt-in or enroll in the dynamic menu service provided by the host computing device. For example, the consumers enroll in the service to use the dynamic menu and to permit retrieval of the consumer data and the geolocation data. The merchants enroll in the service to be notified when enrolled consumers enter their store. During enrollment, the consumers and/or merchants may provide the host computing device with data for the service, such as consumer data and geolocation data. Alternatively, in some embodiments, consumers and/or merchants are automatically enrolled in the service. In such embodiments, the consumers and/or merchants may opt-out of the service.

In certain embodiments, the host computing device is configured to provide a geolocation application to the consumer computing device. Once installed on the consumer computing device, the geolocation application is configured to provide geolocation data from the consumer computing device to the host computing device. In certain embodiments, the geolocation application causes the consumer computing device to transmit geolocation data upon receipt of a geolocation data request message from the host computing device. In other embodiments, the geolocation application causes the consumer computing device to transmit geolocation data according to a predetermined schedule or periodicity (e.g., every 30 seconds). In still other embodiments, the geolocation application causes the consumer computing device to transmit geolocation data when the consumer computing device comes into proximity with a computing device configured to communicate using Bluetooth™, near-field communication (NFC), or a similar short-range communication protocols.

In certain embodiments, the dynamic menu computing device is a standalone device. In other embodiments, the dynamic menu computing device is one of a merchant computing device (such as a point-of-sale terminal) and the consumer computing device. For example, a consumer's mobile phone may function as both the consumer computing device (e.g., by transferring geolocation data and consumer identifiers) and as the dynamic menu computing device (e.g., by receiving consumer profile messages from the host computing device and displaying custom menus to the consumer).

In some embodiments, if the dynamic menu computing device is a merchant computing device, the dynamic menu computing device may be configured to retrieve the consumer data from the consumer computing device. In one example, the consumer transfers the consumer data to the dynamic menu computing device using NFC or other short-range communication protocols. The dynamic menu computing device may be configured to facilitate automated service for the consumer (e.g., facilitating purchases on the dynamic menu). In some embodiments, if automated service is not available and/or manual assistance is requested, the merchant may analyze the consumer data to provide customized service to the consumer. For example, if a consumer has a preferred language, the merchant may send an employee that speaks the consumer's preferred language to assist the consumer.

In certain embodiments, the host computing device may be further configured to transmit the consumer profile message to a customer profile computing device configured to communicate characteristics of the consumer to employees of the merchant. The consumer profile computing device includes a consumer profile application such that when the consumer computing device receives a consumer profile message, the consumer profile message activates the customer profile application to display on the customer profile computing device characteristics of the user based, at least in part, on the consumer data contained in the consumer profile message. The consumer profile computing device may be a standalone device or may be incorporated into a merchant computing device or other suitable computing device.

The following examples of host computing devices and dynamic menu generation are included to provide context for the concepts described in this disclosure. Accordingly, embodiments of the present disclosure are not limited to the following examples.

As a first example, a host computing device according to the present disclosure is configured to facilitate generation of a dynamic menu for a consumer of a restaurant. The host computing device receives geolocation data and a consumer identifier from a consumer computing device of the consumer. Based on the geolocation data and the consumer identifier, the host computing device identifies the restaurant and retrieves consumer data relevant to food and beverage options for the consumer. The host computing device then transmits a consumer profile message to a dynamic menu computing device, such as a tablet, point-of-sale terminal, kiosk, or similar computing device, associated with the restaurant, causing the dynamic menu computing device to display a custom menu tailored according to the consumer data. More specifically, the dynamic menu computing device presents an abbreviated menu in which only a subset of available menu items are presented and/or a rearranged menu in which more relevant menu items are prominently placed in the custom menu. As a first example, the consumer data may include the consumer's age to determine whether the consumer may legally consume alcohol and, as a result, whether such beverages should be included on the custom menu. As another example, the host computing device may retrieve consumer data corresponding to the residence or nationality of the consumer. If the consumer is from a country that is predominantly vegetarian or otherwise adheres to certain dietary restrictions, the menu can be modified to emphasize dishes that meet such dietary restrictions accordingly. In certain embodiments the host computing device may also transmit a consumer profile message to a merchant computing device in order to notify employees of the restaurant regarding characteristics of the consumer. For example, the merchant computing device may be configured to notify employees of the restaurant of the consumer's primary language such that a server who also speaks the same language may be assigned to the consumer's table.

In a second example, a consumer wishes to purchase clothing at a large department store. The department store includes a kiosk to help customers find particular goods sold by the department store. As the customer approaches the kiosk, the kiosk communicates (by, for example, Bluetooth™, NFC, or a similar short-range communication protocol) with a consumer computing device of the consumer, causing the consumer computing device to transmit geolocation data and a consumer identifier to a host computing device or the kiosk that then provides the geolocation data to the host computing device. In response, the host computing device retrieves consumer data, which in this example includes data corresponding to prior purchases by the consumer. In such embodiments, the host computing device may obtain consumer data from a consumer data source that is communicatively coupled to a payment card network and configured to receive consumer purchase data from a payment processor or other entity in the payment network. The consumer data may include various characteristics of items previously purchased by the consumer including, but not limited to, price, color, size, type of clothing, style of clothing, and the like. The host computing device then generates and transmits a consumer profile message containing at least a portion of the consumer device to a dynamic menu computing device, i.e., the kiosk, which displays a menu of clothing items available at the department store based on the retrieved consumer data.

The methods and systems described herein may be implemented using computer programming or engineering techniques including computer software, firmware, hardware or any combination or subset thereof, wherein the technical effect is achieved by performing at least one of: (a) receiving, at a host computing device, geolocation data indicating a current location of a consumer computing device; (b) receiving, at the host computing device, a consumer identifier corresponding to a user of the consumer computing device; (c) identifying a merchant associated with the current location of the consumer computing device; (d) retrieving, based on the consumer identifier, consumer data corresponding to the user of the consumer computing device; (e) generating a consumer profile message based, at least in part, on the consumer data, the consumer profile message containing at least a portion of the consumer data; and (f) transmitting the consumer profile message to a dynamic menu computing device, the dynamic menu computing device including a dynamic menu application, wherein the consumer profile message activates the dynamic menu application to display on the dynamic menu computing device a customized list of menu items based, at least in part, on the consumer data contained in the consumer profile message.

The systems and methods described herein provide the technical advantages of at least one of: (a) improved accuracy and efficiency of automatically generated consumer recommendations; (b) convenient and efficient delivery of dynamically generated menus; (c) introducing automation to facilitate consumer purchasing decisions; and (d) increased consumer and merchant satisfaction and interaction with the dynamic menu generation system.

In one embodiment, a computer program is provided, and the program is embodied on a computer readable medium. In an example, the system is executed on a single computer system, without a connection to a server computer. In a further example, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional examples that also incorporate the recited features.

FIG. 1 is a schematic illustration of an example dynamic menu generation system 100 for dynamically generating custom menus for consumers using a host computing device 102. Host computing device 102 may include one or more computing devices specifically programmed to perform the functions described further herein. In the exemplary embodiment, host computing device 102 is in communication with a consumer database (memory) 104, which contains a variety of information and data, as described below in greater detail. In one embodiment, consumer database 104 is stored within host computing device 102. In alternative embodiments, consumer data source 104 is stored remotely from host computing device 102 and may be non-centralized. Consumer database 104 may include a single database having separated sections or partitions or may include multiple databases, each being separate from each other. For example, consumer database 104 includes a consumer data source containing consumer data including, without limitation, ages, residential locations, purchasing histories, and demographic data for a plurality of consumers. Consumer database 104 may further include consumer data available on one or more social networks associated with a consumer. For example, consumer database 104 may be associated with a computing device (not shown) configured to crawl and/or scrape social network profiles or similar webpages associated with consumers.

Dynamic menu generation system 100 further includes a first plurality of client subsystems, also referred to as client systems or consumer computing devices 106, in communication with host computing device 102 via a network 108. Network 108 may include the Internet and/or one or more other networks. For example, a connection between the computing devices may include a wireless network, a wired network, a telephone network, a cable network, a combination thereof, and the like. Examples of a wireless network include networks such as WiFi, WiMAX, WiBro, local area network, personal area network, metropolitan area network, cellular, Bluetooth, and the like.

Consumer computing devices 106 may be associated with a user, such as user 202 (shown in FIG. 2), of the dynamic menu generation services provided by dynamic menu generation system 100 via host computing device 102. Consumer computing devices 106 may include any computing device such as a smart phone, laptop, desktop, tablet, wearable device (e.g., a "smart watch"), and/or any other computing device. Although three user computing devices 106 are shown in FIG. 1 for clarity, it is understood that dynamic menu generation system 100 may include any number of consumer computing devices 106. Consumer computing devices 106 are generally configured to provide geolocation data to host computing device 102. Based on the geolocation data provided by a particular consumer computing device 106, host computing device 102 determines when the consumer computing device 106, and presumably user 202 of consumer computing device 106, enters into a geographic location associated with a merchant. In addition to geolocation data, consumer computing device 106 is further configured to transmit a consumer identifier corresponding to user 202.

In response to receiving geolocation data and a consumer identifier from consumer computing device 106, host computing device 102 retrieves consumer data from consumer database 104 and generates a consumer profile message based on the retrieved consumer data. Host computing device 102 then transmits the consumer profile message over network 108 to dynamic menu computing device 112.

Dynamic menu computing device 112 may be associated with a merchant offering one or more goods and/or services for sale. Dynamic menu computing device 112 may include any computing device such as a smart phone, laptop, desktop, tablet, wearable device, kiosk, point-of-sale terminal, and/or any other computing device. Dynamic menu computing device 112 generally includes a dynamic menu application installed thereon. When dynamic menu computing device 112 receives a consumer profile message from host computing device 102, the consumer profile message activates the dynamic menu application, causing the dynamic menu application to display on the dynamic menu computing device 112 a customized list of menu items based, at least in part, on the consumer data contained in the consumer profile message. Although one dynamic menu computing devices 108 is shown in FIG. 1 for clarity, it is understood that dynamic menu generation system 100 may include any number of dynamic menu computing devices 108.

Dynamic menu generation system 100 further includes a merchant computing device 110 associated with the merchant offering one or more goods and/or services for sale. Merchant computing device 110 may include any computing device such as a smart phone, laptop, desktop, tablet, wearable device, kiosk, point-of-sale terminal, and/or any other computing device. In certain embodiments, merchant computing device 110 is configured to provide and update menu data, such as pricing information, item descriptions, and item availability, to dynamic menu computing device 106. Merchant computing device 110 may also be configured to receive consumer profile messages from host computing device 102. In certain embodiments, merchant computing device 110 is configured to store consumer data received from host computing device 102, thereby permitting a merchant to track characteristics of consumers entering the merchant's establishment. Merchant computing device 110 may be further configured to present consumer data received from host computing device 102 via a display of host computing device 102. For example, in certain embodiments, merchant computing device 110 identifies a language spoken by the consumer such that a sales associate, server, or similar employee who speaks the same language may be identified to assist the consumer. Although one merchant computing device 110 is shown in FIG. 1 for clarity, it is understood that dynamic menu generation system 100 may include any number of merchant computing devices 110.

Figure 2:
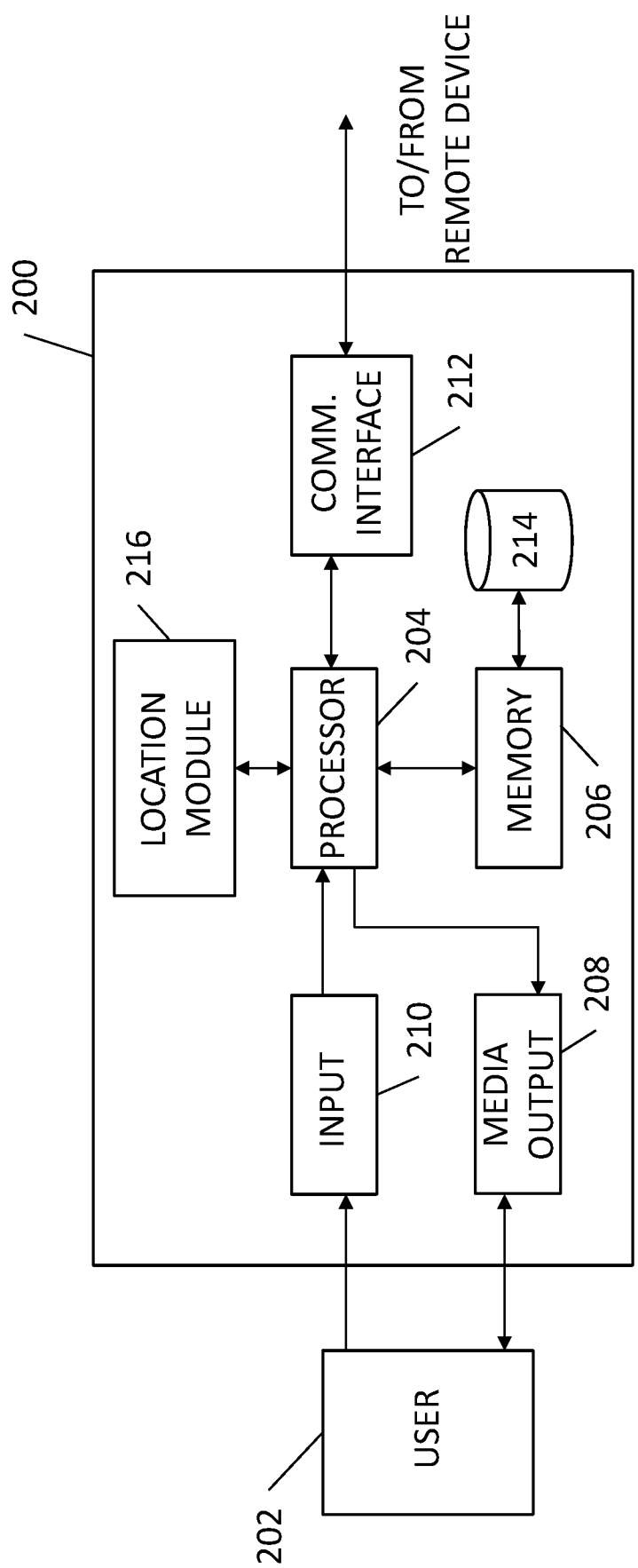

FIG. 2 shows an example configuration of a consumer computer device 200, such as consumer computing device 106 (shown in FIG. 1). In the exemplary embodiment, consumer computer device 200 includes a processor 204 for executing instructions. In some embodiments, executable instructions are stored in a memory area 206. Processor 204 may include one or more processing units (e.g., in a multi-core configuration) for executing instructions. Memory area 206 is any device allowing information such as executable instructions and/or other data to be stored and retrieved. Memory area 206 may include one or more computer-readable media.

Consumer computing device 200 may also include at least one media output component 208 for presenting information to user 202. Media output component 208 may be any component capable of conveying information to user 202. For example, media output component 208 includes an output adapter such as an audio adapter and/or a video adapter. The output adapter is operatively coupled to processor 204 and operatively coupleable to an output device such as an audio output device, such as a speaker or headphones, or a display device, such as a liquid crystal display, organic light emitting diode display, or "electronic ink" display. Stored in memory area 206 are, for example, computer readable instructions for providing a user interface to user 202 via media output component 208.

In certain embodiments, consumer computing device 200 includes an input device 210 for receiving input from user 202. Input device 210 may include, for example, an audio input device such as a microphone, a keyboard, a pointing device, a mouse, a stylus, a touch sensitive panel, a touch pad, a touch screed, a gyroscope, an accelerometer, or a position detector. A single component such as a touch screen may function as both an output device of media output component 208 and input device 210.

Consumer computing device 200 may also include a communication interface 212 operatively coupled to processor 204 such that consumer computing device 200 facilitates communication with one or more remote devices including, but not limited to, external storage devices, client computing devices, and other computing devices. Communication interface 212 may include, for example, a wired or wireless network adapter or a wireless data transceiver for use with a mobile phone network such as GSM, 3G, 4G, or any other mobile data network or WIMAX.

Stored in memory area 206 are, for example, computer readable instructions for providing a user interface to user 202 via media output component 208, and optionally, receiving and processing input from input device 210. A user interface may include, among other possibilities, a web browser and client application. Web browsers enable users 202 to display and interact with media and other information typically embedded on a web page or website from a web server associated with the dynamic menu generation system 100 (shown in FIG. 1). A client application allows user 202 to interact with a host computing device, such as host computing device 102 (shown in FIG. 1) associated with, for example, dynamic menu generation system 100.

Consumer computing device 200 further includes a location module 216 configured to provide location data corresponding to the current position of consumer computing device 200. For example, location module may perform global positioning system ("GPS") functions and provide location data in the form of coordinates corresponding to the current geolocation of consumer computing device 200. Alternatively, consumer computing device 200 may use WiFi positioning, radio frequency location, or any other suitable method of geolocation available. In certain embodiments, location module 216 performs proximity sensing methods using communication protocols such as Bluetooth™, near-field communication (NFC), and the like. For example, location module 216 may be configured to detect a Bluetooth or NFC beacon associated with a merchant and to provide location data in response to detecting the beacon.

In certain embodiments, consumer computing device 200 includes a geolocation application configured to provide geolocation data to a host computing device, such as host computing device 102 (shown in FIG. 1). Geolocation application may be provided to consumer computing device 200 by the host computing device, for example, the host computing device may transmit geolocation application as an executable software package configured to be executed by consumer computing device 200 and to install the geolocation application on consumer computing device 200. In one embodiment, geolocation application is configured to receive a geolocation request messages from the host computing device. The geolocation request message causes the geolocation application to retrieve geolocation data from location module 216 and to transmit, via communication interface 212, the retrieved geolocation data to the host computing device. In another embodiment, the geolocation application is configured to cause consumer computing device 200 to retrieve geolocation data from location module 216 automatically (e.g., based on a predetermined schedule, a periodic polling of location module 216, etc.) and to transmit the geolocation data to the host computing device. In yet another embodiment, the geolocation application is configured to cause consumer computing device 200 to identify a beacon or similar computing device over Bluetooth™, NFC, or a similar proximity-based protocol when consumer computing device 200 is brought into proximity with the beacon. In response to identifying the beacon, consumer computing device 200 obtains geolocation data from location module 216 and transmits the geolocation data to the host computing device.

In certain embodiments, consumer computing device 200 may be configured to operate as dynamic menu computing device 112 (shown in FIG. 1). In such embodiments, user computing device 200 further includes a dynamic menu application and is further configured to receive consumer profile messages transmitted by host computing device 102. Receiving a consumer profile message from host computing device 102 activates the dynamic menu application to display, such as through media output 208, a customized list of menu items based, at least in part, on consumer data contained in the consumer profile message. Activation of the dynamic menu application generally includes causing consumer computing device 200 to open or switch to the dynamic menu application and to cause the dynamic menu application to process the consumer profile message accordingly. Causing consumer computing device 200 to open or switch to the dynamic menu application may include, without limitation, turning on consumer computing device 200, waking consumer computing device 200 from a "sleep" state, and the like.

Figure 3:
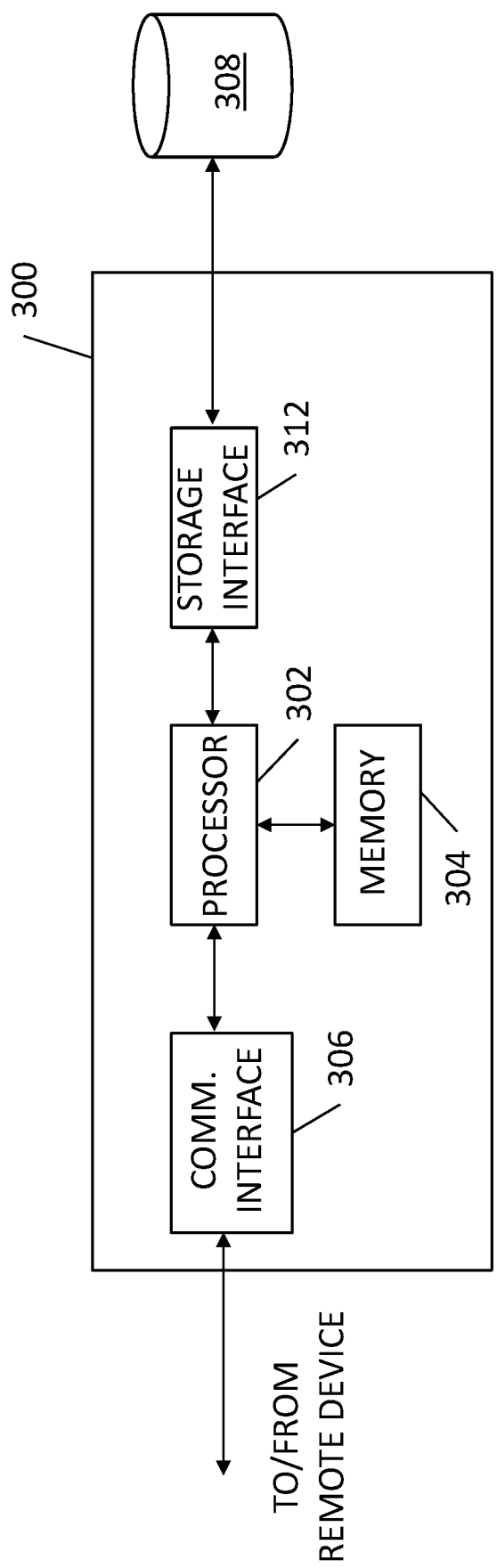

FIG. 3 shows an example configuration of a host computing device 300, such as host computing device 102 (shown in FIG. 1). In the exemplary embodiment, host computing device 300 includes a processor 302 for executing instructions. Instructions may be stored in a memory area 304, for example. Processor 302 may include one or more processing units (e.g., in a multi-core configuration) for executing instructions. The instructions may be executed within a variety of different operating systems on host computing device 300, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C #, C++, Java, or other suitable programming languages, etc.).

Processor 302 is operatively coupled to a communication interface 306 such that host computing device 300 is capable of communication with one or more remote device including, but not limited to, external storage devices, client computing devices, consumer computing devices, dynamic menu computing devices, and other computing devices. Communication interface 306 may include, for example, a transceiver, a transmitter, a receiver, an Ethernet communication interface, an RS-485/EIA-485 communication interface, a GPIB communications interface, a programmable logic controller, an RS-322 communication interface, and/or any other communication interface device and/or component. For example, communication interface 306 may receive, via the Internet, geolocation data from a consumer computing device 106, as illustrated in FIG. 1.

Processor 302 may also be operatively coupled to one or more storage devices, including, consumer data source 308. Storage devices may be any computer-operated hardware suitable for storing and/or retrieving data. In some embodiments, one or more storage devices, such as consumer data source 308, are integrated in host computing device 300. For example, consumer data source 308 and may include multiple storage units such as hard disks or solid state disks in a redundant array of inexpensive disks (RAID) configuration. Data storage devices may include a storage area network (SAN) and/or a network attached storage (NAS) system.

In some embodiments, processor 302 is operatively coupled to storage devices, such as consumer data source 308, via a storage interface 312. Storage interface 312 is any component capable of providing processor 302 with access to a storage device. Storage interface 312 may include, for example, an Advanced Technology Attachment (ATA) adapter, a Serial ATA (SATA) adapter, a Small Computer System Interface (SCSI) adapter, a RAID controller, a SAN adapter, and/or any component providing processor 302 with access to a storage device. In certain embodiments, host computing device 300 may be communicatively coupled to one or more storage devices, including consumer data source 308, which are remote from host computing device 300 but be accessible by host computing device 300 through one or more of communication interface 306 and storage interface 312.

Memory area 304 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Host computing device 300 is generally in communication with a consumer computing device and a dynamic menu computing device, such as consumer computing device 106 and dynamic menu computing device 112 (both shown in FIG. 1), and facilitates generation of a dynamic menu on the dynamic menu computing device 112.

In at least some embodiments, consumers and/or merchants opt-in or enroll in the dynamic menu service provided by host computing device 300 such that consumer computing device 106 and merchant computing device 110 (shown in FIG. 1) are associated with enrolled consumers and merchants, respectively. For example, the consumers enroll in the service to use the dynamic menu and to permit retrieval of the consumer data and the geolocation data. The merchants enroll in the service to be notified when enrolled consumers enter their store. During enrollment, the consumers and/or merchants may provide host computing device 300 with data for the service, such as consumer data and geolocation data. For example, a consumer may customize his or her profile by providing consumer data directly or indirectly (e.g., a language setting of consumer computing device 106 (shown in FIG. 1) is read to determine the consumer's preferred language). In at least some embodiments, host computing device 300 may be associated with an interface or portal accessible by the consumer to receive additional consumer data and/or to enable the consumer to modify previously stored consumer data. Alternatively, in some embodiments, consumers and/or merchants are automatically enrolled in the service. In such embodiments, the consumers and/or merchants may opt-out of the service.

During operation, host computing device 300 receives geolocation data from the consumer computing device via communication interface 306. Host computing device 300 further receives a consumer identifier corresponding to a user of the consumer computing device. In certain embodiments, geolocation data and the consumer identifier are received by host computing device 300 in one or more messages from the consumer computing device and are parsed from the messages by communications interface 306 and/or processor 302.

Host computing device 300 identifies a merchant based on the geolocation data. More specifically, host computing device 300 identifies a merchant by determining whether the location represented by the geolocation data corresponds to a geographic area associated with a particular merchant. In certain embodiments, host computing device 300 refers to a merchant database or similar data structure communicatively coupled to host computing device 300. For example, a merchant database may include general merchant information (e.g., names, addresses, internet protocol (IP) addresses) and geolocation data defining a geographic area corresponding to each merchant.

Host computing device 300 further retrieves consumer data from a consumer data source based on the consumer identifier received from the consumer computing device. To do so, host computing device 300 executes a query or otherwise submits a request for consumer data corresponding to the consumer identifier to the consumer data source. In certain embodiments, the host computing device may also utilize merchant information to filter or limit the consumer data retrieved from the computer data source. For example, if the merchant is a restaurant, the host computing device may limit any requests for consumer data to consumer data relevant only to restaurant purchases. Alternatively, the host computing device may receive all consumer data from the consumer data source and perform any necessary filter of the consumer data upon receipt.

Using the consumer data, the host computing device generates a consumer profile message that includes at least a portion of the consumer data. The consumer profile message is configured to be transmitted from the host computing device to a dynamic menu computing device on which a dynamic menu application is installed. The consumer profile message is further configured to activate the dynamic menu application upon receipt of the consumer profile message by the dynamic menu computing device. Activation of the dynamic menu application generally includes causing the dynamic menu computing device to open or switch to the dynamic menu application and to cause the dynamic menu application to process the consumer profile message. Causing the dynamic menu computing device to open or switch to the dynamic menu application may further include, without limitation, turning on the dynamic menu computing device, waking the dynamic menu computing device from a "sleep" state, and the like.

Figure 4:
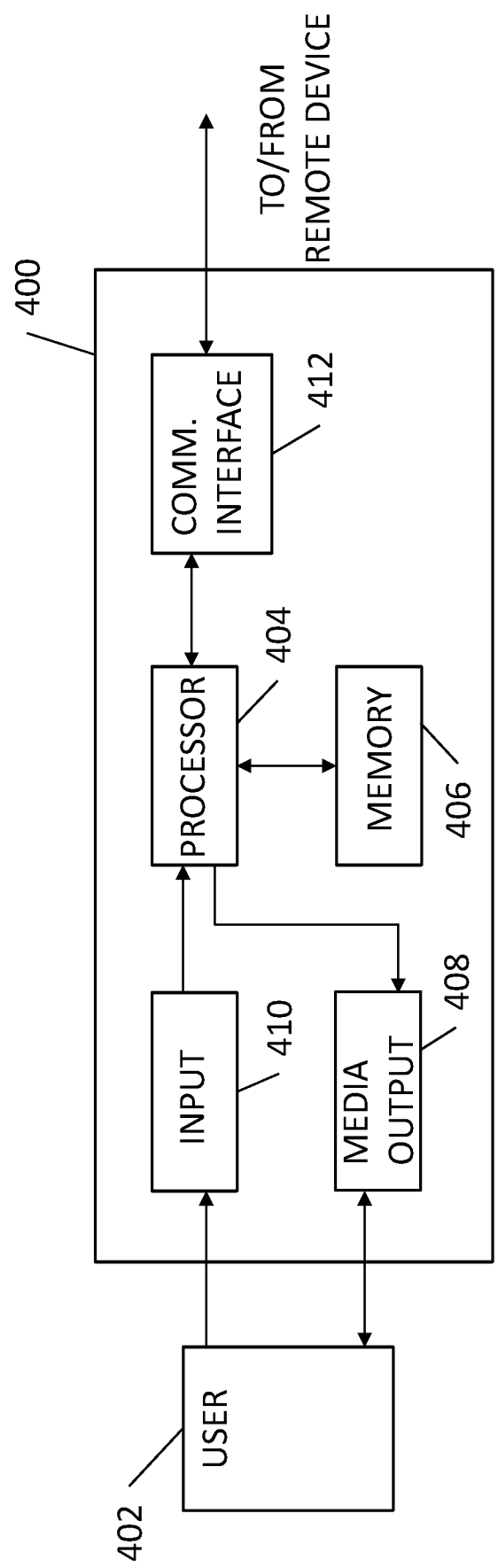

FIG. 4 shows an example configuration of a dynamic menu computer device 400, such as dynamic menu computing device 112 (shown in FIG. 1). In the exemplary embodiment, dynamic menu computer device 400 includes a processor 404 for executing instructions. In some embodiments, executable instructions are stored in a memory area 406. Processor 404 may include one or more processing units (e.g., in a multi-core configuration) for executing instructions. Memory area 406 is any device allowing information such as executable instructions and/or other data to be stored and retrieved. Memory area 406 may include one or more computer-readable media.

Dynamic menu computing device 400 may also include at least one media output component 408 for presenting information to a user 402. Media output component 408 may be any component capable of conveying information to user 402. For example, media output component 408 includes an output adapter such as an audio adapter and/or a video adapter. The output adapter is operatively coupled to processor 404 and operatively coupleable to an output device such as an audio output device, such as a speaker or headphones, or a display device, such as a liquid crystal display, organic light emitting diode display, or "electronic ink" display. Stored in memory area 406 are, for example, computer readable instructions for providing a user interface to user 402 via media output component 408.

In certain embodiments, dynamic menu computing device 400 includes an input device 410 for receiving input from user 402. Input device 410 may include, for example, an audio input device such as a microphone, a keyboard, a pointing device, a mouse, a stylus, a touch sensitive panel, a touch pad, a touch screed, a gyroscope, an accelerometer, or a position detector. A single component such as a touch screen may function as both an output device of media output component 408 and input device 410.

Dynamic menu computing device 400 may also include a communication interface 412 operatively coupled to processor 404 such that user computing device 400 facilitates communication with one or more remote devices including, but not limited to, external storage devices, client computing devices, and other computing devices. Communication interface 412 may include, for example, a wired or wireless network adapter or a wireless data transceiver for use with a mobile phone network such as GSM, 3G, 4G, or any other mobile data network or WIMAX.

Stored in memory area 406 are, for example, computer readable instructions for providing a user interface to user 402 via media output component 408, and optionally, receiving and processing input from input device 410. A user interface may include, among other possibilities, a web browser and client application. Web browsers enable users 402 to display and interact with media and other information typically embedded on a web page or website from a web server associated with the dynamic menu generation system 100 (shown in FIG. 1). A client application allows user 402 to interact with a host computing device, such as host computing device 102 (shown in FIG. 1) associated with, for example, dynamic menu generation system 100.

During operation, dynamic menu computing device 400 is configured to receive consumer profile messages from a host computing device, such as host computing device 300 of FIG. 3, and to display or otherwise present a customized list of menu items based, at least in part, on consumer data contained in the consumer profile message. In certain embodiments, dynamic menu computing device 400 displays the customized list of menu items via media output component 408.

Displaying the customized list of menu items generally includes parsing or otherwise extracting the consumer data form the consumer profile message and processing a primary list of menu items based on the extracted consumer data. In certain embodiments, processing the primary list of menu items includes filtering the primary list of menu items based on the consumer data. In other embodiments, processing the primary list of menu items includes rearranging the primary list of menu items to prioritize certain menu items based on the consumer data. The primary list of menu items may be stored locally on dynamic menu computing device, such as in memory area 406, or may be stored in a remote data source accessible by dynamic menu computing device 400 via communication interface 412.

In some embodiments, dynamic menu computing device 400 is a merchant computing device 110 (shown in FIG. 1). In such embodiments, dynamic menu computing device 400 may be configured to retrieve the consumer data from the consumer computing device. In one example, the consumer transmits the consumer data to dynamic menu computing device 400 using NFC or other short-range communication protocols. Dynamic menu computing device 400 may be configured to facilitate automated service for the consumer (e.g., facilitating purchases on the dynamic menu). In some embodiments, if automated service is not available and/or manual assistance is requested, the merchant may analyze the consumer data to provide customized service to the consumer. For example, if a consumer has a preferred language, the merchant may send an employee that speaks the consumer's preferred language to assist the consumer.

Figure 5:
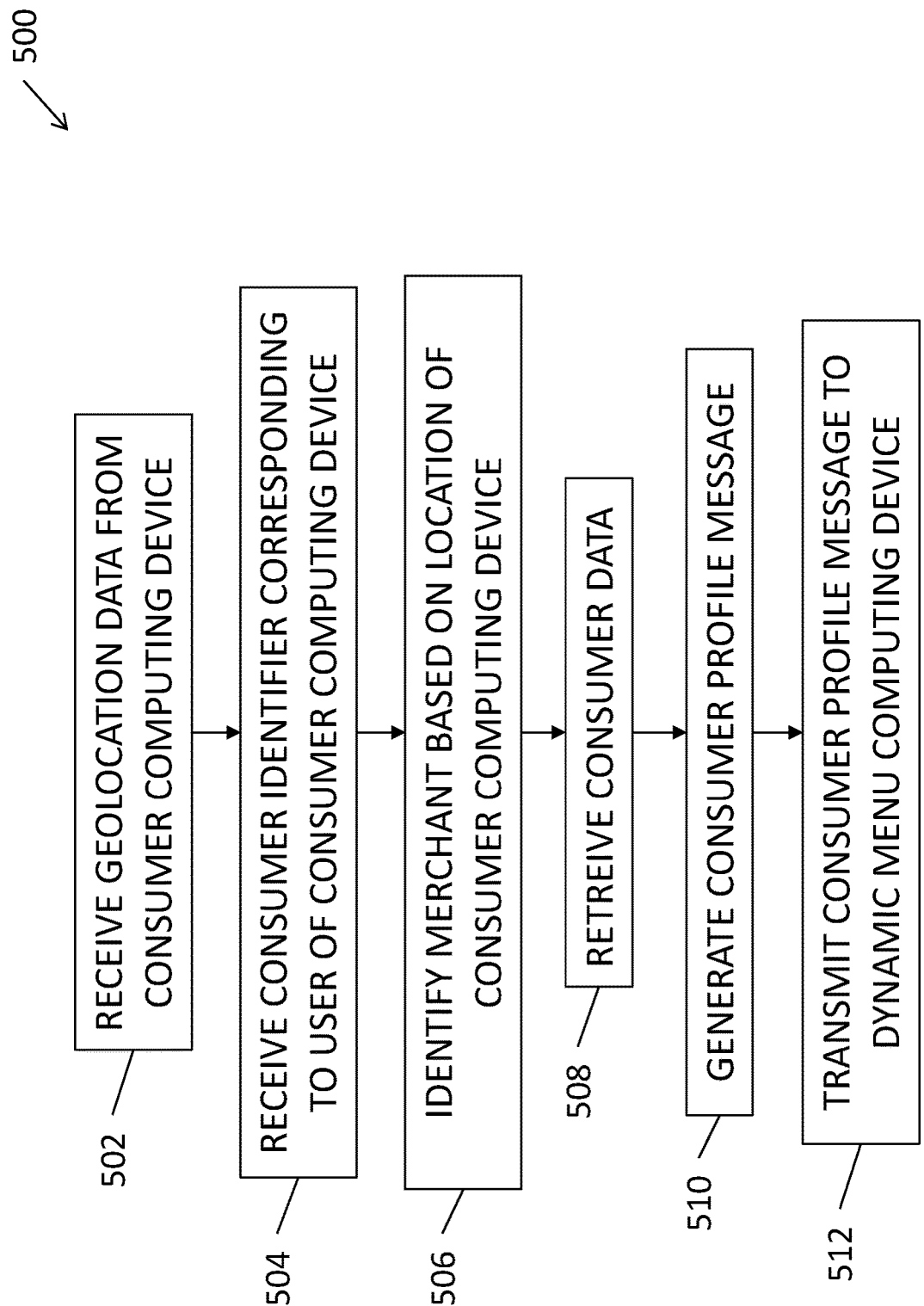

FIG. 5 is a flow chart illustrating an example of a method 500 for dynamically generating menus using a host computing device, such as host computing device 102 of FIG. 1 and host computing device 300 of FIG. 3.

The host computing device of method 500 receives 502 geolocation data from a consumer computing device. The consumer computing device generally includes a location module, such as location module 216 of consumer computing device 200 (shown in FIG. 2), capable of determining the location of the consumer computing device. For example, the location module may perform GPS functions and generate geolocation data in the form of GPS coordinates. In certain embodiments, the consumer computing device includes a geolocation application configured to be executed by the consumer computing device and to cause the consumer computing device to obtain geolocation data from the location module. Once geolocation data is obtained, the geolocation application causes the consumer computing device to transmit the geolocation data to the host computing device.

Method 500 further includes receiving 504 a consumer identifier corresponding to a user of the consumer computing device for later retrieval 508 of consumer data based on the consumer identifier. In general, the consumer identifier is transmitted by the consumer computing device to the host computing device in conjunction with the geolocation data. For example, in certain embodiments, the geolocation data and consumer identifier are included in a message transmitted to the host computing device from the consumer computing device. In an example embodiment, consumer data is stored in one or more consumer data sources accessible by the host computing device. Consumer data may include, without limitation, age, residential location, previous purchases, language, and general preferences of the consumer. Consumer data may be obtained from various sources. As a first example, the consumer may provide personal information, preferences, and the like during a registration process in which the consumer signs up for dynamic menu generation services. In such an example, the consumer may access an interface (e.g., an application or web portal) associated with stored consumer data to provide additional consumer data or modify previously stored consumer data. As another example, consumer data may also be compiled from a payment card transaction history or other purchase history of the consumer. In still another example, consumer data may be compiled by scraping a consumer's social media or similar account.

In some embodiments, merchants may provide consumer data collected during transactions, such as item-level details associated with purchased products and/or services, or other consumer interactions (e.g., a consumer registering for an account with the merchant). In certain embodiments, the host computing device may receive consumer data, such as item-level detail from merchants through a web interface associated with the host computing device. In some embodiments, the host computing device is configured to infer at least some consumer data (e.g., item-level detail) based on collected merchant data associated with the merchant. The merchant data may be collected, for example, from the merchant, the merchant's website, third party databases, and the like. In one example, the host computing device may receive a purchase amount of a transaction with a merchant. The host computing device infers item-level detail based on the purchase amount, other consumer data (e.g., the consumer's preferences), and merchant data collected from the merchant's website.

Consumer data is generally stored in the consumer data source according to unique consumer identifiers assigned to each consumer that uses a dynamic menu generation system according to the present disclosure. To retrieve consumer data associated with a particular consumer, the host computing device performs a lookup, query, or similar operation based on the consumer identifier to retrieve consumer data associated with a particular consumer identifier.

Based on the received geolocation data, the host computing device identifies 506 a merchant corresponding to the location represented by the geolocation data. For example, in certain embodiments, the geolocation data corresponds to a set of coordinates indicating the location of the consumer computing device and the host computing device has access to sets of coordinates defining areas corresponding to various merchants. Accordingly, the host computing device determines a merchant corresponding to the geolocation data by identifying a merchant whose corresponding area encompasses the coordinates of the geolocation data. In an alternative embodiment, the geolocation data may include a unique identifier corresponding to a merchant. In such embodiments, the host computing device performs a lookup, query, or similar operation on a database containing merchant details based on merchant identifiers.

As previously noted, the host computing device further retrieves 508 consumer data based on the consumer identifier. The retrieved consumer data is then processed by the host computing device to generate 510 a consumer profile message. The consumer profile message generally includes a subset of the retrieved consumer data that is relevant to the identified merchant. In certain embodiments, the subset of data to include in a given consumer profile message may be based on one or more of the type of merchant, privacy or preference settings established by the consumer, preferences of the merchant, and the like.

Once generated, the host computing device transmits 512 the consumer profile message to a dynamic menu computing device on which a dynamic menu application is installed. Receipt of the consumer profile message activates the dynamic menu application to display on the dynamic menu computing device a customized list of menu items based, at least in part, on the consumer data contained in the consumer profile message. Activation of the dynamic menu application generally includes causing the dynamic menu computing device to open or switch to the dynamic menu application and to cause the dynamic menu application to process the consumer profile message. Causing the dynamic menu computing device to open or switch to the dynamic menu application may include, without limitation, turning on the dynamic menu computing device, waking the dynamic menu computing device from a "sleep" state, and the like.

In certain embodiments, methods in accordance with this disclosure further include transmitting a consumer profile message to a merchant computing device on which a consumer profile application is installed. Receipt of the consumer profile message activates the consumer profile application to display on the merchant computing device a profile of the consumer based on the consumer data contained in the consumer profile message. Activation of the consumer profile menu application generally includes causing the dynamic menu computing device to open or switch to the dynamic menu application and to cause the dynamic menu application to process the consumer profile message.

Any processor in a computing device referred to herein may refer to one or more processors wherein the processor may be in one computing device or a plurality of computing devices acting in parallel. Additionally, any memory in a computing device referred to herein may also refer to one or more memories wherein the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is a flexible system for various aspects of fraud analysis of payment card transactions. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

Computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

For example, one or more computer-readable storage media may include computer-executable instructions embodied thereon for dynamically generating customized menus. In this example, the computing device may include a memory device and a processor in communication with the memory device, and when executed by said processor, the computer-executable instructions may cause the processor to perform a method, such as the methods described and illustrated in the examples of FIG. 5.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A host computing device comprising one or more processors in communication with one or more memory devices, said host computing device configured to:
provide an executable software package to a consumer computing device, wherein the executable software package is configured to be executed by the consumer computing device to install a geolocation application on the consumer computing device, the geolocation application configured to cause the consumer computing device to transmit geolocation data and a consumer ID to the host computing device in response to a detection, by the consumer computing device, of a near-field-communication (NFC) signal from a merchant device;
receive, from the geolocation application executing on the consumer computing device via the Internet, the geolocation data indicating coordinates of a current location of the consumer computing device;
receive, from the geolocation application executing on the consumer computing device via the Internet, the consumer identifier corresponding to a user of the consumer computing device;
access a database of sets of coordinates, each of the sets of coordinates defining a geographic area associated with a corresponding one of a plurality of merchants, and identify, from the plurality of merchants, a merchant having a geographic area that encompasses the coordinates of the current location of the consumer computing device;
retrieve, from a consumer data source database using the consumer identifier received from the geolocation application, consumer data corresponding to the user of the consumer computing device, the consumer data comprising demographic information of the user;
generate a consumer profile message based, at least in part, on the retrieved consumer data, wherein the consumer profile message includes the demographic information; and
transmit the consumer profile message to a dynamic menu computing device, the dynamic menu computing device including a dynamic menu application,
wherein the consumer profile message activates the dynamic menu application to display on the dynamic menu computing device a customized list of menu items of the identified merchant based, at least in part, on the consumer data included in the consumer profile message, wherein the customized list is customized to exclude or de-emphasize menu items that are inconsistent with the demographic information.

2. The host computing device of claim 1, wherein the demographic information contained in the consumer profile message includes at least one of: (i) an age of the user; (ii) a residential location of the user; and (iii) a language of the user.

3. The host computing device of claim 1 further configured to:
transmit a geolocation request message to the consumer computing device, wherein the geolocation request message activates the geolocation application to transmit the geolocation data indicating the current location of the consumer computing device.

4. The host computing device of claim 1, wherein the geolocation application is configured to cause the consumer computing device to transmit periodically the geolocation data to the host computing device.

5. The host computing device of claim 1 wherein the geolocation application is configured to transmit the geolocation data from the consumer computing device in response to the consumer computing device coming into proximity with a merchant computing device.

6. The host computing device of claim 1, wherein the dynamic menu computing device is a merchant computing device.

7. The host computing device of claim 1, wherein the dynamic menu computing device is the consumer computing device.

8. The host computing device of claim 1, wherein displaying the customized list of menu items includes generating the customized list of menu items by at least one of: (i) filtering a primary list of menu items based on the consumer data contained in the consumer profile message; and (ii) rearranging, based on the consumer data contained in the consumer profile message, one of a primary list of menu items and a filtered list of menu items derived from the primary list of menu items.

9. The host computing device of claim 1 further configured to:
    transmit the consumer profile message to a merchant computing device including a consumer profile application,
    wherein the consumer profile message activates the consumer profile application to display on the merchant computing device characteristics of the user based, at least in part, on the consumer data contained in the consumer profile message.

10. A computer-implemented method for dynamically generating a custom menu of items available from a merchant, the method being implemented by a host computing device, the method comprising:
    providing, by the host computing device, an executable software package to a consumer computing device, wherein the executable software package is configured to be executed by the consumer computing device to install a geolocation application on the consumer computing device, the geolocation application configured to cause the consumer computing device to transmit geolocation data and a consumer ID to the host computing device in response to a detection, by the consumer computing device, of a near-field-communication (NFC) signal from a merchant device;
    receiving, at the host computing device from the geolocation application executing on the consumer computing device via the Internet, the geolocation data indicating a current location of the consumer computing device;
    receiving, at the host computing device from the geolocation application executing on the consumer computing device via the Internet, the consumer identifier corresponding to a user of the consumer computing device;
    access a database of sets of coordinates, each of the sets of coordinates defining a geographic area associated with a corresponding one of a plurality of merchants, and identify, from the plurality of merchants, a merchant having a geographic area that encompasses the coordinates of the current location of the consumer computing device;
    retrieving, from a consumer data source database using the consumer identifier received from the geolocation application, consumer data corresponding to the user of the consumer computing device, the consumer data comprising demographic information of the user;
    generating a consumer profile message based, at least in part, on the retrieved consumer data, wherein the consumer profile message includes the demographic information; and
    transmitting the consumer profile message to a dynamic menu computing device, the dynamic menu computing device including a dynamic menu application,
    wherein the consumer profile message activates the dynamic menu application to display on the dynamic menu computing device a customized list of menu items based, at least in part, on the demographic information contained in the consumer profile message, including at least one of:
    excluding alcoholic beverages from the display in response to the demographic information indicating an age of the consumer as less than a legal limit for consumption of alcohol; and
    de-emphasizing menu items on the display that do not meet a dietary restriction identified from the demographic information.

11. The computer-implemented method of claim 10, wherein the consumer data contained in the consumer profile message further includes at least one of: (i) (ii) data corresponding to one or more previous purchases of the user; and (iii) preferences obtained from one or more social media accounts associated with the user.

12. The computer implemented method of claim 10, further comprising:
    transmitting a geolocation request message to the consumer computing device,
    wherein the geolocation request message activates the geolocation application to transmit the geolocation data indicating the current location of the consumer computing device.

13. The computer implemented method of claim 10, wherein the geolocation application is configured to cause the consumer computing device to transmit periodically the geolocation data to the host computing device.

14. The computer implemented method of claim 10, wherein the geolocation application is configured to transmit the geolocation data from the consumer computing device in response to the consumer computing device coming into proximity with a merchant computing device.

15. The computer implemented method of claim 10, wherein the dynamic menu computing device is a merchant computing device.

16. The computer implemented method of claim 10, wherein the dynamic menu computing device is the consumer computing device.

17. The computer implemented method of claim 10, wherein displaying the customized list of menu items includes at least one of: (i) filtering a primary list of menu items based on the consumer data contained in the consumer profile message; and (ii) rearranging, based on the consumer data contained in the consumer profile message, one of a primary list of menu items and a filtered list of menu items derived from the primary list of menu items.

18. The computer implemented method of claim 10, further comprising:

transmitting the consumer profile message to a merchant computing device including a consumer profile application,
wherein the consumer profile message activates the consumer profile application to display on the dynamic menu computing device characteristics of the consumer based, at least in part, on the consumer data included in the consumer profile message.

19. A non-transitory computer readable medium that includes computer executable instructions for facilitating dynamic generation of a custom menu of items available from a merchant, wherein when executed by a host computing device comprising at least one processor in communication with at least one memory device, the computer executable instructions cause the host computing device to:
provide an executable software package to a consumer computing device, wherein the executable software package is configured to be executed by the consumer computing device to install a geolocation application on the consumer computing device, the geolocation application configured to cause the consumer computing device to transmit geolocation data and a consumer ID to the host computing device in response to a detection, by the consumer computing device, of a near-field-communication (NFC) signal from a merchant device;
receive, from the geolocation application executing on the consumer computing device via the Internet, the geolocation data indicating a current location of a consumer computing device;
receive, from the geolocation application executing on the consumer computing device via the Internet, the consumer identifier corresponding to a user of the consumer computing device;
access a database of sets of coordinates, each of the sets of coordinates defining a geographic area associated with a corresponding one of a plurality of merchants, and identify, from the plurality of merchants, a merchant having a geographic area that encompasses the coordinates of the current location of the consumer computing device;
retrieve, from a consumer data source database using the consumer identifier received from the geolocation application, consumer data corresponding to the user of the consumer computing device, the consumer data comprising demographic information of the user;
generate a consumer profile message based, at least in part, on the retrieved consumer data, wherein the consumer profile message includes the demographic information; and
transmit the consumer profile message to a dynamic menu computing device, the dynamic menu computing device including a dynamic menu application,
wherein the consumer profile message activates the dynamic menu application to display on the dynamic menu computing device a customized list of menu items of the identified merchant based, at least in part, on the consumer data included in the consumer profile message, wherein the customized list is customized to exclude or de-emphasize menu items that are inconsistent with the demographic information.

20. The non-transitory computer readable medium of claim 19, wherein the consumer data contained in the consumer profile message includes at least one of: (i) an age of the user; (ii) a residential location of the user; and (iii) a language of the user.

21. The non-transitory computer readable medium of claim 19, wherein the consumer data corresponding to the user of the consumer computing device includes at least one of (i) consumer data received from a merchant, (ii) consumer data provided by the user through a web portal, and (iii) consumer data inferred by the host computing device.

* * * * *